(12) United States Patent
Michie

(10) Patent No.: US 12,384,468 B2
(45) Date of Patent: Aug. 12, 2025

(54) WEATHER SHIELD FOR A VEHICLE CHARGE PORT

(71) Applicant: GM Global Technology Operations LLC, Detroit, MI (US)

(72) Inventor: John Kenneth Michie, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 18/353,316

(22) Filed: Jul. 17, 2023

(65) Prior Publication Data

US 2025/0026414 A1  Jan. 23, 2025

(51) Int. Cl.
*B62D 25/24* (2006.01)
*B60L 53/16* (2019.01)
*H01R 13/631* (2006.01)

(52) U.S. Cl.
CPC .............. *B62D 25/24* (2013.01); *B60L 53/16* (2019.02); *H01R 13/631* (2013.01); *H01R 2201/26* (2013.01)

(58) Field of Classification Search
CPC ...................................................... B60L 53/16
See application file for complete search history.

(56) References Cited

U.S. PATENT DOCUMENTS

| 7,794,280 B1 * | 9/2010 | Markyvech | B60L 50/16 320/120 |
| 8,720,968 B2 * | 5/2014 | Zalan | B60L 53/16 296/97.22 |
| 9,327,594 B2 * | 5/2016 | Georgi | E05B 77/54 |

(Continued)

FOREIGN PATENT DOCUMENTS

| CN | 112590946 A | 4/2021 |
| CN | 216545765 U | 5/2022 |
| DE | 102014111273 A1 | 2/2015 |

OTHER PUBLICATIONS

BestEVmod. "A charging port protector in the case of charging outside in a rain or snow day." Rivian Forums. https://www.https://www.rivianforums.com/forum/threads/a-charging-port-protector-in-the-case-of-charging-outside-in-a-rain-or-snow-day.15905/ Jun. 2023. 2 pages.

(Continued)

*Primary Examiner* — Erez Gurari

(74) *Attorney, Agent, or Firm* — CANTOR COLBURN LLP

(57) ABSTRACT

A vehicle charge system includes a charge port having a charge port receptacle and a connector receiver. The charge port receptacle is configured to transfer electrical energy to a rechargeable electric storage system. A charge port shield is supported at the charge port. The charge port shield includes a base member having a peripheral edge defining a first surface and an opposing second surface. The base member includes an opening alignable with the charge port receptacle and a connector extending outwardly of the second surface. The connector being received by the connector receiver in the charge port to align the opening with the charge port receptacle. A frame extends about the peripheral edge of the base member. The frame includes a plurality of walls that project outwardly of the first surface of the base member. The plurality of walls and the first surface of the base member form a recess.

20 Claims, 3 Drawing Sheets

(56) References Cited

U.S. PATENT DOCUMENTS

| | | | |
|---|---|---|---|
| 9,597,968 B2* | 3/2017 | Schoener | H01R 13/5219 |
| 10,717,383 B2* | 7/2020 | Ueno | B60Q 1/323 |
| 10,899,243 B2* | 1/2021 | Kang | E05D 3/02 |
| 11,230,203 B2* | 1/2022 | Ghannam | B60L 53/66 |
| 11,466,496 B2* | 10/2022 | Shin | E05D 15/165 |
| 11,486,172 B2* | 11/2022 | Bai | B60L 53/16 |
| 11,548,379 B2* | 1/2023 | Salter | B60K 15/05 |
| 11,634,025 B2* | 4/2023 | Rudolf | E05D 3/145 49/339 |
| 11,904,767 B2* | 2/2024 | Kim | E05D 11/0081 |
| 2013/0326955 A1* | 12/2013 | Kotama | E05F 15/40 49/13 |
| 2015/0042275 A1 | 2/2015 | Schoener et al. | |
| 2017/0197515 A1* | 7/2017 | Southey | B60K 15/05 |
| 2017/0368928 A1* | 12/2017 | Mori | B60K 15/05 |
| 2020/0055389 A1* | 2/2020 | Herzig | E05D 3/125 |
| 2022/0332199 A1* | 10/2022 | Cho | H01R 13/447 |
| 2023/0177896 A1* | 6/2023 | Lv | B60K 15/05 701/22 |
| 2023/0243203 A1* | 8/2023 | Sun | B60Q 9/00 49/13 |
| 2024/0149716 A1* | 5/2024 | Ive | B60L 53/16 |
| 2024/0227587 A1* | 7/2024 | Tache | B60L 53/16 |
| 2024/0253509 A1* | 8/2024 | Diamond | B60L 53/66 |
| 2024/0337144 A1* | 10/2024 | Och | B60L 53/16 |
| 2024/0409164 A1* | 12/2024 | Nemer | B60L 53/16 |
| 2025/0026414 A1* | 1/2025 | Michie | B60L 53/16 |
| 2025/0058659 A1* | 2/2025 | Sun | B60L 53/16 |

OTHER PUBLICATIONS

Favomoto. "Favomoto EV Charger Plug Port Cover Rainproof Waterproof Outdoor Electric Car Charging Port Cover Rain Sun UV Snow Protection for Electric Vehicles Yellow." Amazon. https://www.amazon.com/dp/B09WMS4N5z?ref=emc_s_m_5_i_atc. Mar. 2022. 3 pages.

Ford Motor Company. "F-150 Charge Port Weather Kit for BEV Lightning Only." Ford Accessories. https://accessories.ford.ca/shop/en/ca/f-150-charge-port-weather-kit-for-bev-lightning-only-pl3z-10d802-a (2022). 4 pages.

German Application No. 10 2023 127 505.4 filed Oct. 9, 2023; German Office Action dated Dec. 9, 2024; 8 pages.

* cited by examiner

WEATHER SHIELD FOR A VEHICLE CHARGE PORT

INTRODUCTION

The subject disclosure relates to the art of electric vehicles and, more particularly, to a charge port weather shield for an electric vehicle.

Electric vehicles include a charge port that is typically covered by a door. The door protects a charge receptacle from weather, dirt, and debris during driving and when parked outdoors. When charging, the door is opened and a charging device is connected to the charge receptacle. When the door is open, and the vehicle is charging out of doors, the charge receptacle may be exposed to weather. Rain, snow, and dirt accumulating between the charging device and the charge receptacle could affect charging efficiency. Accordingly, it is desirable to provide a device that shields vehicle charging components from the weather.

SUMMARY

A vehicle charge system, in accordance with a non-limiting example, includes a charge port having a charge port receptacle and a connector receiver. The charge port receptacle is configured to transfer electrical energy from an electrical source to a rechargeable electric storage system (RESS). A charge port shield is supported at the charge port. The charge port shield includes a base member having a peripheral edge defining a first surface and an opposing second surface. The base member includes an opening alignable with the charge port receptacle and a connector extending outwardly of the second surface. The connector being received by the connector receiver in the charge port to align the opening with the charge port receptacle. A frame extends about the peripheral edge of the base member. The frame includes a plurality of walls that project outwardly of the first surface of the base member. The plurality of walls and the first surface of the base member form a recess.

In addition to one or more of the features described herein the plurality of walls include a first wall, a second wall, a first side wall connecting the first wall and the second wall and a second side wall connecting the first wall and the second wall, the second wall, first side wall, and the second side wall extending from the first surface a first distance and the first wall extending from the first surface a second distance that is greater than the first distance.

In addition to one or more of the features described herein the first wall defines an upper wall and the second wall defines a lower wall.

In addition to one or more of the features described herein each of the first wall, the second wall, the first side wall, and the second side wall extend from the first surface at an angle.

In addition to one or more of the features described herein each of the first wall, the second wall, the first side wall, and the second side wall extend from the base member at an obtuse angle relative to the first surface.

In addition to one or more of the features described herein each of the first wall, the second wall, the first side wall, the second side wall, and the first surface of the base member form an external charging device receiving cavity.

In addition to one or more of the features described herein the connector receiver comprises a quick charge port.

In addition to one or more of the features described herein the connector comprises a dummy quick charge connector.

A vehicle, in accordance with a non-limiting example, includes a body defining a passenger compartment, an electric motor supported in the body, a rechargeable energy storage system (RESS) supported at the body. A charge port supported at the body. The charge port including a charge port receptacle connected to the RESS. A charge port shield is supported at the charge port. The charge port shield includes a base member having a peripheral edge defining a first surface and an opposing second surface. The base member includes an opening alignable with the charge port receptacle and a connector extending outwardly of the second surface. The connector is received by the connector receiver in the charge port to align the opening with the charge port receptacle. A frame extends about the peripheral edge of the base member. The frame includes a plurality of walls that project outwardly of the first surface of the base member. The plurality of walls and the first surface of the base member forming a recess.

In addition to one or more of the features described herein the plurality of walls include a first wall, a second wall, a first side wall connecting the first wall and the second wall and a second side wall connecting the first wall and the second wall, the second wall, first side wall, and the second side wall extending from the first surface a first distance and the first wall extending from the first surface a second distance that is greater than the first distance.

In addition to one or more of the features described herein the first wall defines an upper wall and the second wall defines a lower wall.

In addition to one or more of the features described herein an external charging device is electrically connected to the chare port receptacle at an interface, the upper wall extending from the base member over the interface.

In addition to one or more of the features described herein the external charging device includes a handle, the upper wall extending over a portion of the handle.

In addition to one or more of the features described herein each of the first wall, the second wall, the first side wall, the second side wall, and the first surface of the base member form a cavity receptive of the external charging device.

In addition to one or more of the features described herein the connector receiver comprises a quick charge port.

In addition to one or more of the features described herein the connector comprises a dummy quick charge connector supported on the external charging device.

In addition to one or more of the features described herein the external charging device includes a charge plug connected to the charge port receptacle.

In addition to one or more of the features described herein the charge plug extends through the opening into the charge port receptacle.

In addition to one or more of the features described herein each of the first wall, the second wall, the first side wall, and the second side wall extend from the first surface at an angle.

In addition to one or more of the features described herein each of the first wall, the second wall, the first side wall, and the second side wall extend from the base member at an obtuse angle relative to the first surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
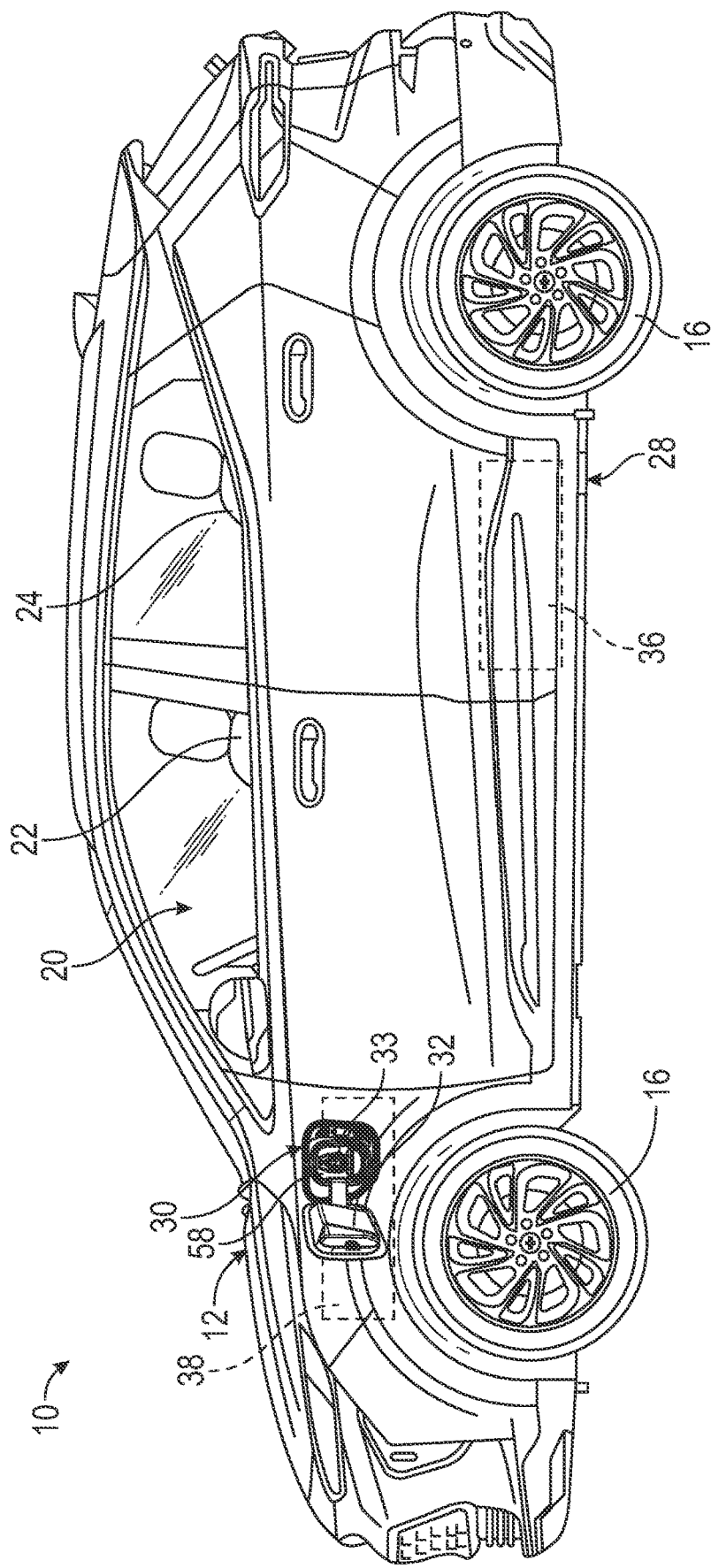
FIG. 1 is a left side view of a vehicle including a charge port weather shield, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown) and a plurality of wheels 16. Body 12 includes a passenger compartment 20 that includes a driver's seat 22 and at least one rear passenger seat 24. Vehicle 10 takes the form of an electric vehicle (EV) 28 including a charge port 30 having a door 32 that is selectively pivotally mounted to body 12. Charge port 30 includes a charge port receptacle 33 and a fast charge port 34, FIG. 2, that may form a connector, receiver 35 as will be discussed herein. Charge port receptacle 33 and fast charge port 34 are connected to a rechargeable energy storage system (RESS) 36 supported in body 12. RESS 36 is operatively connected to an electric motor 38 that provides motive power to vehicle 10.

Figure 2:
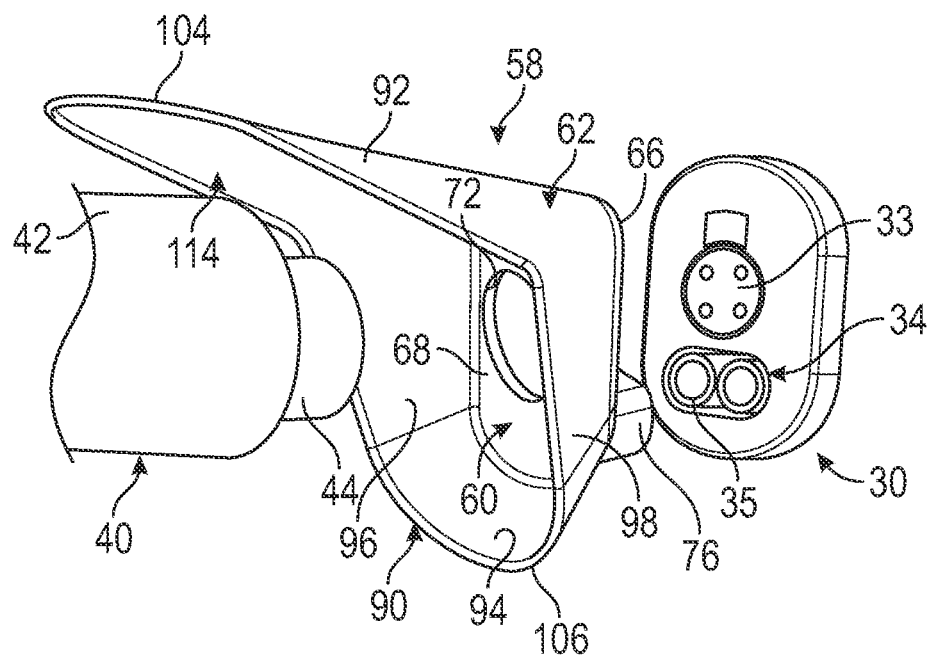
FIG. 2 is a disassembled view of the charge port weather shield prior to mounting to a charge port of the vehicle of FIG. 1, in accordance with a non-limiting example.

As shown in FIG. 2, an external charging device 40 is selectively connected to charge port 30. External charging device 40 forms part of a charging station (not shown) that, when connected to charge port 30, provides electric energy to RESS 36. External charging device 40 includes a handle 42 that supports a charging connector 44. A charge port shield 58 may serve as an interface between external charging device 40 and charge port 30. As will be detailed more fully herein, charge port shield 58 protects charge port 30 from external elements such as rain, snow, and the like.

Figure 3:
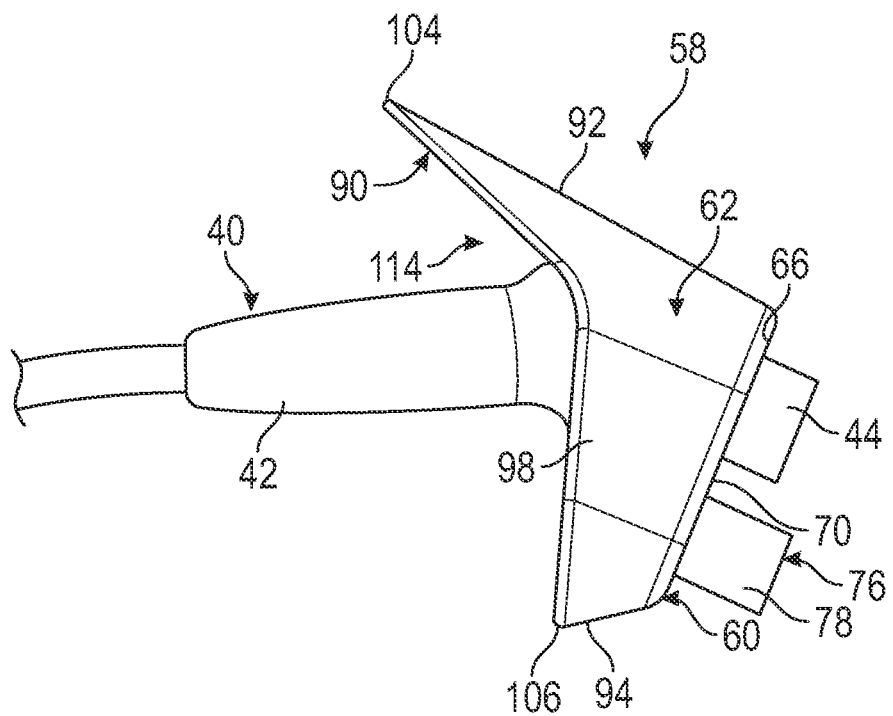
FIG. 3 is a side view of the charge port weather shield and charge connector, in accordance with a non-limiting example.
Figure 4:
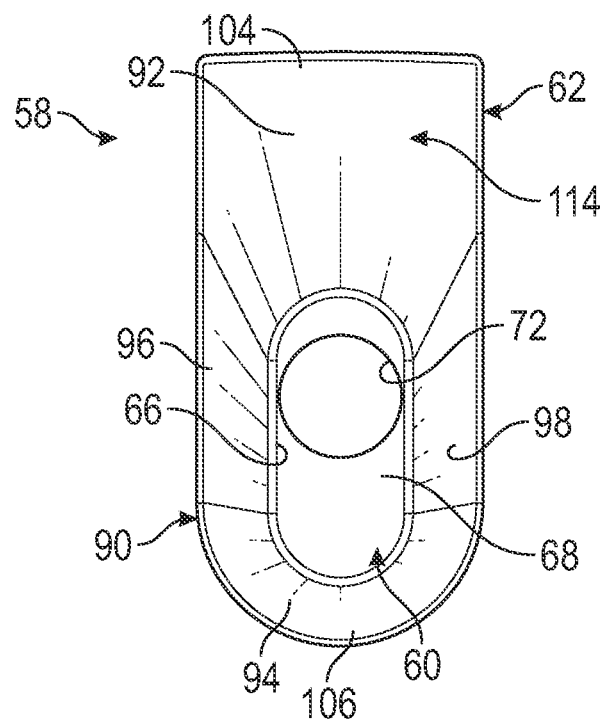
FIG. 4 is a front plan view of the charge port weather shield of FIG. 3, in accordance with a non-limiting example.
Figure 5:
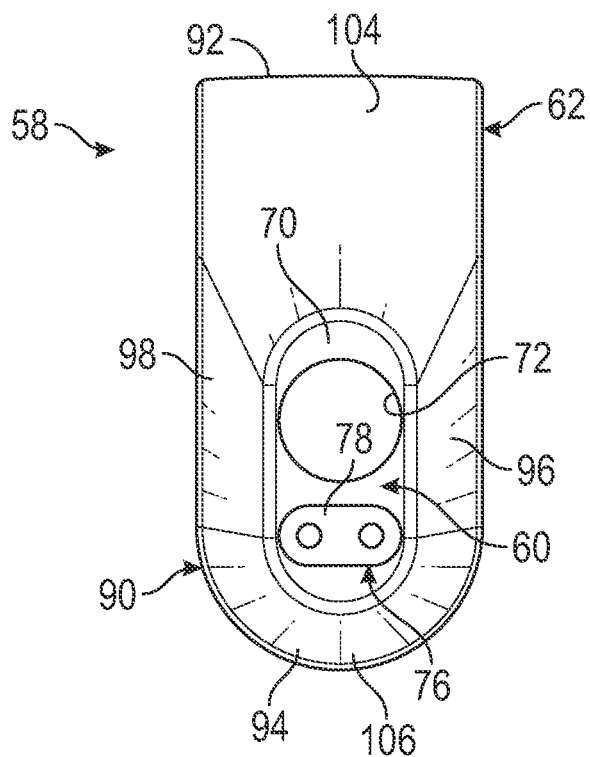
FIG. 5 is a rear plan view of the charge port weather shield of FIG. 3, in accordance with a non-limiting example.

Referring to FIG. 3 and with continued reference to FIG. 2, charge port shield 58 includes a base member 60 and a frame 62. Base member 60 includes a peripheral edge 66 defining a first surface 68 and a second surface 70 that is opposite first surface 68. An opening 72 passes through base member 60. As will be detailed more fully herein, opening 72 is receptive of charging connector 44. In a non-limiting example, a connector 76 projects outwardly from second surface 70. Connector 76 takes the form of a dummy fast charging connector 78. Dummy fast charging connector 78 does not include any electrical connections and may be received by connector receiver 35 of fast charge port 34. Connector 76 selectively joins charge port shield 58 to charge port 30.

In a non-limiting example, frame 62 is formed by a plurality of walls 90 that extend about peripheral edge 66 of base member 60. Plurality of walls 90 include a first wall 92, a second wall 94, a first side wall 96, and a second side wall 98. First side wall 96 and second side wall 98 extend between and connect with first wall 92 and second wall 94.

In a non-limiting example, when charge port shield 58 is connected to charge port 30, first wall 92 is a top or upper wall 104 and second wall 94 is a bottom or lower wall 106.

In a non-limiting example, each of the plurality of walls 90 extend at an angle from base member 60 so as to form a recess or cup-like structure. In a non-limiting example, each of the plurality of walls 90 extend at an obtuse angle relative to first surface 68 from peripheral edge 66 of base member 60. In a non-limiting example, each of the second wall 94, the first side wall 96 and the second side wall 98 extend from base member 60 a first distance, and first wall 92 extends from base member 60 a second distance that is greater than the first distance. In this manner, first wall 92 forms a cover or hood 114 that protects charge port receptacle 33 from weather and other contaminants when charging outdoors.

In a non-limiting example, charge port shield 58 is secured to vehicle 10 by inserting connector 76 into connector receiver 35 of charge port 30. When connected, opening 72 is aligned with and exposes charge port receptacle 33. At this point, external charging device 40 may be connected to charge port 30 by inserting charging connector 44 through opening 72 into charge port receptacle 33 forming an electrical interface. In a non-limiting example, first wall 92 extends over the electrical interface. In another non-limiting example, first wall 92 extends from base member 60 over a portion of handle 42 in order to protect the electrical interface from external elements such as rain, snow, dirt and the like.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle charge system comprising:
a charge port including a charge port receptacle and a connector receiver, the charge port receptacle being configured to transfer electrical energy from an electrical source to a rechargeable electric storage system (RESS); and
a charge port shield supported at the charge port, the charge port shield comprising:
a base member having a peripheral edge defining a first surface and a second surface opposite the first surface, the base member including an opening alignable with the charge port receptacle and a connector extending outwardly of the second surface, the connector being received by the connector receiver in the charge port to align the opening with the charge port receptacle; and
a frame extending about the peripheral edge of the base member, the frame including a plurality of walls that project outwardly of the first surface of the base member, the plurality of walls and the first surface of the base member forming a recess,
wherein the connector receiver comprises a quick charge port, and
wherein the connector comprises a dummy quick charge connector.

2. A vehicle charge system comprising:
a charge port including a charge port receptacle and a connector receiver, the charge port receptacle being configured to transfer electrical energy from an electrical source to a rechargeable electric storage system (RESS); and
a charge port shield supported at the charge port, the charge port shield comprising:
a base member having a peripheral edge defining a first surface and a second surface opposite the first surface, the base member including an opening alignable with the charge port receptacle and a connector extending outwardly of the second surface, the connector being received by the connector receiver in the charge port to align the opening with the charge port receptacle; and
a frame extending about the peripheral edge of the base member, the frame including a plurality of walls that project outwardly of the first surface of the base member, the plurality of walls and the first surface of the base member forming a recess,
wherein the plurality of walls include a first wall, a second wall, a first side wall connecting the first wall and the second wall and a second side wall connecting the first wall and the second wall, the second wall, the first side wall, and the second side wall extending from the first surface a first distance and the first wall extending from the first surface a second distance that is greater than the first distance.

3. The vehicle charge system according to claim 2, wherein the first wall defines an upper wall and the second wall defines a lower wall.

4. The vehicle charge system according to claim 2, wherein each of the first wall, the second wall, the first side wall, and the second side wall extend from the first surface at an angle.

5. The vehicle charge system according to claim 4, wherein each of the first wall, the second wall, the first side wall, and the second side wall extend from the base member at an obtuse angle relative to the first surface.

6. The vehicle charge system according to claim 4, wherein each of the first wall, the second wall, the first side wall, the second side wall, and the first surface of the base member form an external charging device receiving cavity.

7. The vehicle charge system according to claim 2, wherein the connector receiver comprises a quick charge port.

8. The vehicle charge system according to claim 7, wherein the connector comprises a dummy quick charge connector.

9. A vehicle comprising:
a body defining a passenger compartment;
an electric motor supported in the body;
a rechargeable energy storage system (RESS) supported at the body;
a charge port supported at the body, the charge port including a charge port receptacle connected to the RESS and a connector receiver; and
a charge port shield supported at the charge port, the charge port shield comprising:
a base member having a peripheral edge defining a first surface and a second surface opposite the first surface, the base member including an opening alignable with the charge port receptacle and a connector extending outwardly of the second surface, the connector being received by the connector receiver in the charge port to align the opening with the charge port receptacle; and
a frame extending about the peripheral edge of the base member, the frame including a plurality of walls that project outwardly of the first surface of the base member, the plurality of walls and the first surface of the base member forming a recess,
wherein the plurality of walls include a first wall, a second wall, a first side wall connecting the first wall and the second wall and a second side wall connecting the first wall and the second wall, the second wall, first side wall, and the second side wall extending from the first surface a first distance and the first wall extending from the first surface a second distance that is greater than the first distance.

10. The vehicle according to claim 9, wherein the first wall defines an upper wall and the second wall defines a lower wall.

11. The vehicle according to claim 10, further comprising an external charging device electrically connected to the charge port receptacle at an interface, the upper wall extending from the base member over the interface.

12. The vehicle according to claim 11, wherein the external charging device includes a handle, the upper wall extending over a portion of the handle.

13. The vehicle according to claim 11, wherein each of the first wall, the second wall, the first side wall, the second side wall, and the first surface of the base member form a cavity receptive of the external charging device.

14. The vehicle according to claim 11, wherein the connector receiver comprises a quick charge port.

15. The vehicle according to claim 14, wherein the connector comprises a dummy quick charge connector supported on the external charging device.

16. The vehicle according to claim 11, wherein the external charging device includes a charge plug connected to the charge port receptacle.

17. The vehicle according to claim 16, wherein the charge plug extends through the opening into the charge port receptacle.

18. The vehicle according to claim 9, wherein each of the first wall, the second wall, the first side wall, and the second side wall extend from the first surface at an angle.

19. The vehicle according to claim 9, wherein each of the first wall, the second wall, the first side wall, and the second side wall extend from the base member at an obtuse angle relative to the first surface.

20. The vehicle according to claim 9, wherein the connector receiver comprises a quick charge port, and wherein the connector comprises a dummy quick charge connector.

* * * * *